US005551952A

United States Patent [19]

Falgout

[11] Patent Number: 5,551,952

[45] Date of Patent: Sep. 3, 1996

[54] TEETHING RING

[76] Inventor: Andreé M. Falgout, 104 Gladys St., Houma, La. 70364

[21] Appl. No.: 386,290

[22] Filed: Feb. 9, 1995

[51] Int. Cl.[6] ........ A61C 5/00

[52] U.S. Cl. ........ 601/139; 606/235

[58] Field of Search ........ 601/46, 38, 67, 601/70, 78, 79, 139; 606/234, 235

[56] References Cited

U.S. PATENT DOCUMENTS

| | | | |
|---|---|---|---|
| 1,826,943 | 10/1931 | Maker | 606/235 |
| 2,687,717 | 8/1954 | Murphy | 601/70 |
| 2,826,201 | 3/1958 | Yoder | 606/235 |
| 3,115,139 | 12/1963 | Schneider | 606/235 |
| 3,967,617 | 7/1976 | Krolik . | |
| 4,116,202 | 9/1978 | Panicci . | |
| 4,123,844 | 11/1978 | Kurz | 32/14 |
| 4,947,832 | 8/1990 | Blitzer | 601/70 |
| 5,030,098 | 7/1991 | Branford | 601/46 |
| 5,181,504 | 1/1993 | Ono | 601/70 |
| 5,291,878 | 3/1994 | Lombardo et al. . | |

FOREIGN PATENT DOCUMENTS

| | | | |
|---|---|---|---|
| 873347 | 5/1987 | South Africa | 606/235 |

*Primary Examiner*—Robert A. Hafer
*Assistant Examiner*—David J. Kenealy
*Attorney, Agent, or Firm*—Joseph N. Breaux

[57] ABSTRACT

A teething ring comprising a teething member and a mechanism for causing vibrations in the teething member. The teething member has a portion thereof of a size sufficient to allow an infant to place the portion between its gums. The portion is constructed of a resilient material and preferably includes a first surface having a plurality of protrusions extending therefrom, and more preferably includes a first and second surface each having a plurality of protrusions extending therefrom. The protrusions preferably included a rounded end section at the end of each protrusion located farthest from either the first or second surface. The vibrating mechanism may be any mechanism which will cause the portion of the teething member placeable between the gums of the infant to vibrate. The vibrating mechanism preferably causes the portion to vibrate at between 0.5 and 100 cycles per second; and more preferably includes a mechanism for allowing the frequency of vibration to be adjusted to a frequency which best mollifies the infant using the teething ring.

1 Claim, 2 Drawing Sheets

TEETHING RING

TECHNICAL FIELD

The present invention relates to devices for comforting a teething infant and more particularly to devices for comforting a teething infant that having a mechanism for causing the teething element to vibrate.

BACKGROUND ART

Teething infants can be difficult to be around because of the crying which results from the pain experienced from teething. An infant has an instinct to chew of small items in order to aid in the eruption of the first set of teeth. This instinct has usually been satisfied by supplying the child with a teething apparatus upon which to chew. The U.S. Patents issued to Lombardo et al., and to Panicci are exemplary of the type of teething devices available.

U.S. Pat. No. 5,291,878 to Lombardo et al. discloses: a baby teething gum massager having a body in the shape of a figure eight with a forward curved portion dimensioned to fit within a child's opened mouth and a rearward curved portion which is wider than a child's mouth. The forward curved portion contains a plurality of tufts of bristles embedded on opposite sides of the forward portion.

U.S. Patent to Panicci discloses: a teether comprising separate sheets of plastic material sealed together along their edges. The sheets define separate cells connected by narrow necks. The cells contain fluid under pressure which may travel from cell to cell when the one of the cells is deformed by pressure from a child's mouth.

Although these teething devices can help to quiet a teething infant, it has been found by the inventor hereof that the addition of a vibrating mechanism to a teething apparatus will quiet almost all teething infants.

GENERAL SUMMARY DISCUSSION OF INVENTION

It is thus an object of the invention to provide a teething ring that has a vibrating teething element.

It is a further object of the invention to provide a teething ring that will sooth a teething infant.

It is a still further object of the invention to provide a teething ring that will aid in causing teeth to erupt.

It is a still further object of the invention to provide a teething ring that has a vibrating teething element which has an adjustment mechanism for adjusting the frequency of vibrations.

Accordingly a teething ring is provided. The teething ring comprises: a teething member and a mechanism for causing vibrations in the teething member.

The teething member has a portion thereof of a size sufficient to allow an infant to place the portion between its gums. The portion is constructed of a resilient material and preferably includes a first surface having a plurality of protrusions extending therefrom, and more preferably includes a first and second surface each having a plurality of protrusions extending therefrom. The protrusions preferably include a rounded end section at the end of each protrusion located farthest from either the first or second surface.

The vibrating mechanism may be any mechanism which will cause the portion of the teething member placeable between the gums of the infant to vibrate. The vibrating mechanism preferably causes the portion to vibrate at between 0.5 and 100 cycles per second; and more preferably includes a mechanism for allowing the frequency of vibration to be adjusted to a frequency which best mollifies the infant using the teething ring.

In a preferred embodiment, the mechanism for causing the portion to vibrate includes a mass attached to a rotatable shaft.

In another preferred embodiment, the mechanism for causing the portion to vibrate includes an electric motor having a rotatable shaft. When an embodiment having an electric motor with a rotatable shaft is used, the mechanism for causing the portion to vibrate further includes a battery connection mechanism having a first and second contact suitable for connection with a battery. In addition, the mechanism for adjusting the frequency of vibration may include an adjustable resistance element connected in series with windings of the electric motor.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
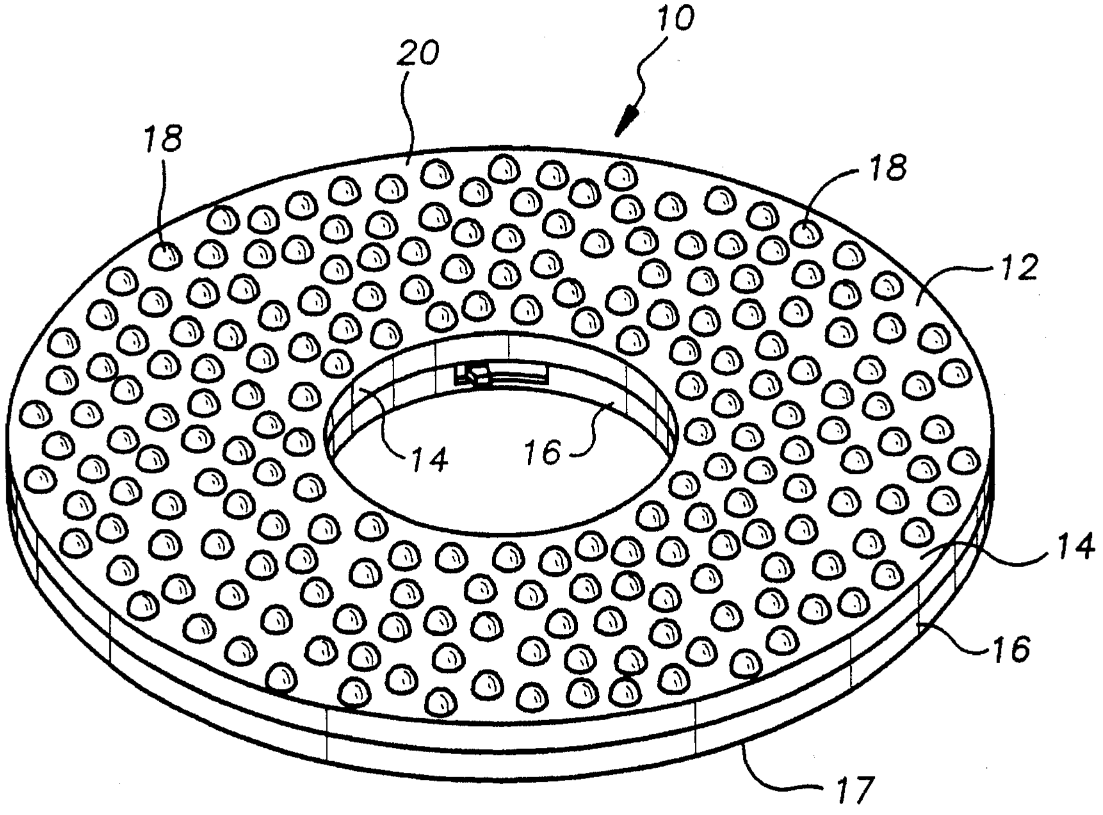
FIG. 1 is an isometric view of an exemplary embodiment of the teething ring of the present invention.

FIG. 1 shows an exemplary embodiment of the teething ring of present invention generally designated by the numeral 10. Teething ring 10 includes a teething member 12 and a vibration mechanism enclosed within a housing (not shown) formed within teething member 12.

Figure 2:
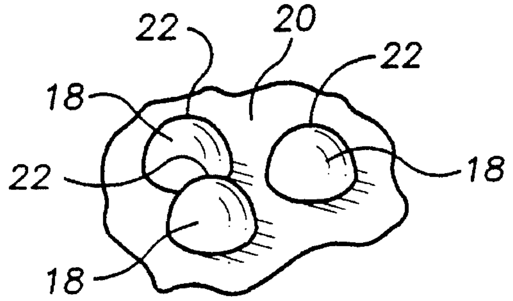
FIG. 2 is a detail view of a preferred protrusion shape.

In this embodiment, teething member 12 is constructed of a first and second washer shaped member 14,16 having an outer diameter of about 8 centimeters, an inner diameter of about 2½ centimeters, and a thickness of about 6 millimeters. First and second washer shaped members 14,16 are constructed of resilient plastic. First and second washer shaped members 14,16 include a plurality of resilient protrusions 18 located on an outer surface 20,17. Protrusions 18 extend about two millimeters outward from outer surfaces 20,17. FIG. 2 is a detail view of three protrusions 18 illustrating the rounded end portion 22.

Figure 3:
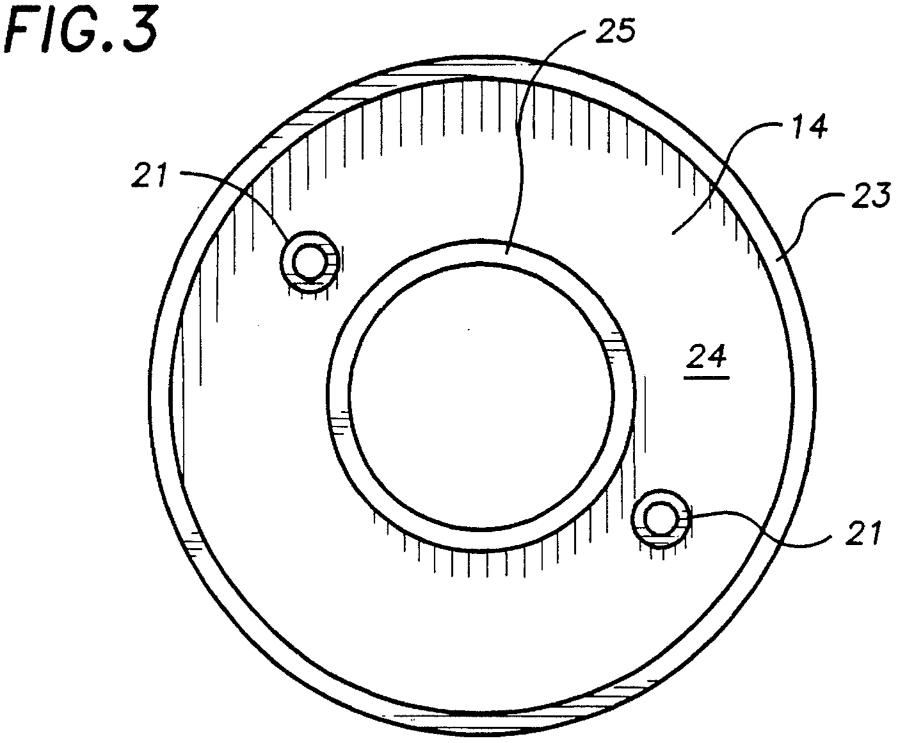
FIG. 3 is an internal view of first washer shaped member 14.

FIG. 3 is an internal view of first washer shaped member 14. As shown in the figure, first washer shaped member 14 includes a hollow portion 24 defined by a rim 23 and a rim 25. Hollow portion 24 forms part of the housing within which the vibrating mechanism is disposed and includes two female snap connectors 21.

Figure 4:
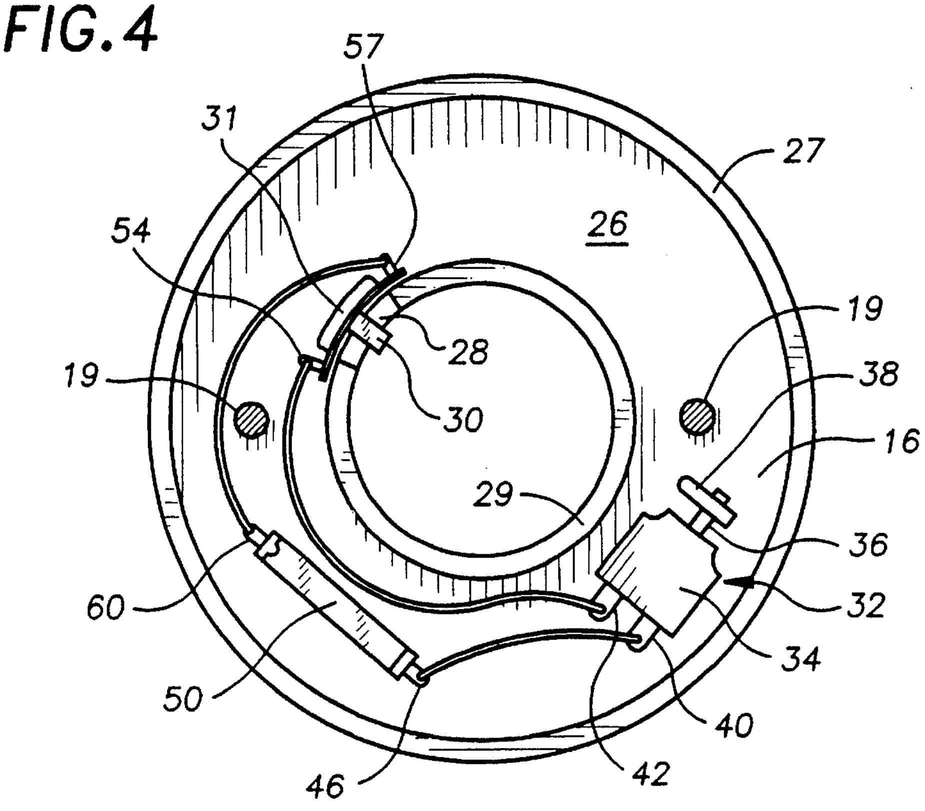
FIG. 4 is an internal view of second washer member 16.

FIG. 4 is an internal view of second washer member 16. Second washer shaped member 16 includes a hollow portion 26 defined by a rim 27 and a rim 29. Hollow portion 26, in combination with hollow portion 24, forms the housing within which the vibrating mechanism is disposed. Two male snap connectors 19 are disposed within hollow portion 26 in a manner to register with female snap connectors 21 and function in combination with female snap connectors 21 to detachably secure first and second washer shaped members 14,16 together.

Rim 29 includes an aperture 28 having a s hide switch 30 extending therethrough. Slide switch 30 forms part of a variable resistor 31 which forms the vibration frequency controller of the vibrating mechanism 32. By sliding slide switch 30 to various positions within aperture 28, the frequency of vibrations may be adjusted to suit the individual infant's favorite vibrational frequency.

Vibrating mechanism 32 includes an electric motor 34 having a rotating shaft 36 and two electric terminals 40,42. A mass 38 is attached to the end of rotating shaft 36. Mass 38 is mounted with its center of mass off center from the axis of rotation of rotating shaft 36 so as to cause vibrations when rotating shaft 36 rotates. One electric terminal 40 is connected to a contact 46 of a battery holder 50. The other electric terminal 42 is attached to an end terminal 54 of variable resistor 31. Variable resistor 31 has an electrical take-off 57. Electrical take-off 57 is connected to a second contact 60 of battery holder 50. The electrical resistance between end terminal 54 and electrical take-off 57 is variable by sliding slide switch 30 within aperture 28. Slide switch 30 is positionable in a location which creates an open circuit between end terminal 54 and electrical take-off 57. When slide switch 30 is in this position, vibrating mechanism 32 is in the off condition.

Use of teething ring 10 is now described with general reference to FIGS. 1–4. A battery is placed between contact 46 and contact 60 of battery holder 50. First and second washer shaped members 14,16 are then secured together by inserting male snap connectors 19 into female snap connectors 21 and snapping first and second washer shaped members 14,16 together. Vibrating mechanism 32 is started by moving sliding switch 30 into a non-open-circuit position. The frequency of vibration is adjusted by moving slide switch 30 along aperture 28 until a desired frequency is reached. If desired, this frequency adjustment may be made while the infant has a portion of teething member 12 between its gums.

It can be seen from the preceding description that a method and device for comforting a teething infant which has a vibrating teething element, will sooth a teething infant, will aid in causing teeth to erupt, and is enjoyable for the infant to use has been provided.

It is noted that the embodiment of the teething ring described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A teething ring comprising:

a teething member including a first and second washer shaped member, each said first and second washer shaped member having, respectively, a first and second hollow cavity, a first and second central aperture, and a first and second portion constructed from a resilient material and of a size sufficient to allow an infant to place said portions between its gums, said first portion including a first surface having a plurality of first protrusions extending therefrom, each said first protrusion having a rounded end portion, said second portion including a second surface having a plurality of second protrusions extending therefrom, each said second protrusion having a rounded end portion; and a means for causing said first and second portions to vibrate at between 0.5 and 100 cycles per second, said means for causing said first and second portions to vibrate including:

an electric motor having a rotatable shaft, a mass attached to said rotatable shaft, a first and second contact in electrical connection with said electric motor suitable for connection with a battery, and means, in electrical connection between one of said first and second contacts and said electric motor, for adjusting the frequency of vibration, said means having an adjustable resistance element having an adjusting switch extending exteriorly of said teething ring that is positionable by a user;

said first and second washer members being secured together in a manner such that said first and second central apertures are concentrically aligned, said first and second hollow cavities form a chamber containing said means for causing said first and second portions to vibrate, and said adjusting switch extends partially into at least one of said first and second central apertures.

* * * * *